United States Patent [19]
Kokus

[11] 4,409,855
[45] Oct. 18, 1983

[54] MOTION TO ROTARY MOTION

[76] Inventor: Martin Kokus, R.D. #4, Box 48, Ebensburg, Pa. 15931

[21] Appl. No.: 340,356

[22] Filed: Apr. 9, 1982

[51] Int. Cl.³ ............................................. F16H 25/14
[52] U.S. Cl. ............................................ 74/55; 74/49
[58] Field of Search ................... 74/36, 49, 50, 55, 88

[56] References Cited
U.S. PATENT DOCUMENTS

| 283,558 | 8/1883 | Baumgarten | 74/55 |
| 1,993,135 | 3/1935 | Friedland | 74/55 |
| 2,229,545 | 1/1941 | Beckstrom | 74/50 |

Primary Examiner—Lawrence J. Staab

[57] ABSTRACT

The machine translates linear reciprocating motion to rotating motion by placing two wedge cams on opposite sides of an opening in a reciprocating piston. The cams operate on a rotating follower within the opening, moving it in a complete rotation when the piston moves through a complete reciprocation or cycle. The wedges and the rotating follower surfaces are such that a line connecting the point of contact between them and the axis of rotation of the rotating follower will always be perpendicular to the direction of motion of the reciprocating member. The surfaces are also chosen so that there is no sliding motion between them during the cycle; that is the contact between the parts is pure rolling contact. This machine is suitable for the power take off from a free piston or other reciprocating engine. It is especially applicable in lowering the pollutants from such engines, for as a consequence of the quick expansion of the combustion chamber at the beginning of the stroke, nitrous oxides are reduced, and the slow expansion at the stroke's end forces combustion into the boundary layer and reduces hydrocarbon emission as well.

1 Claim, 2 Drawing Figures

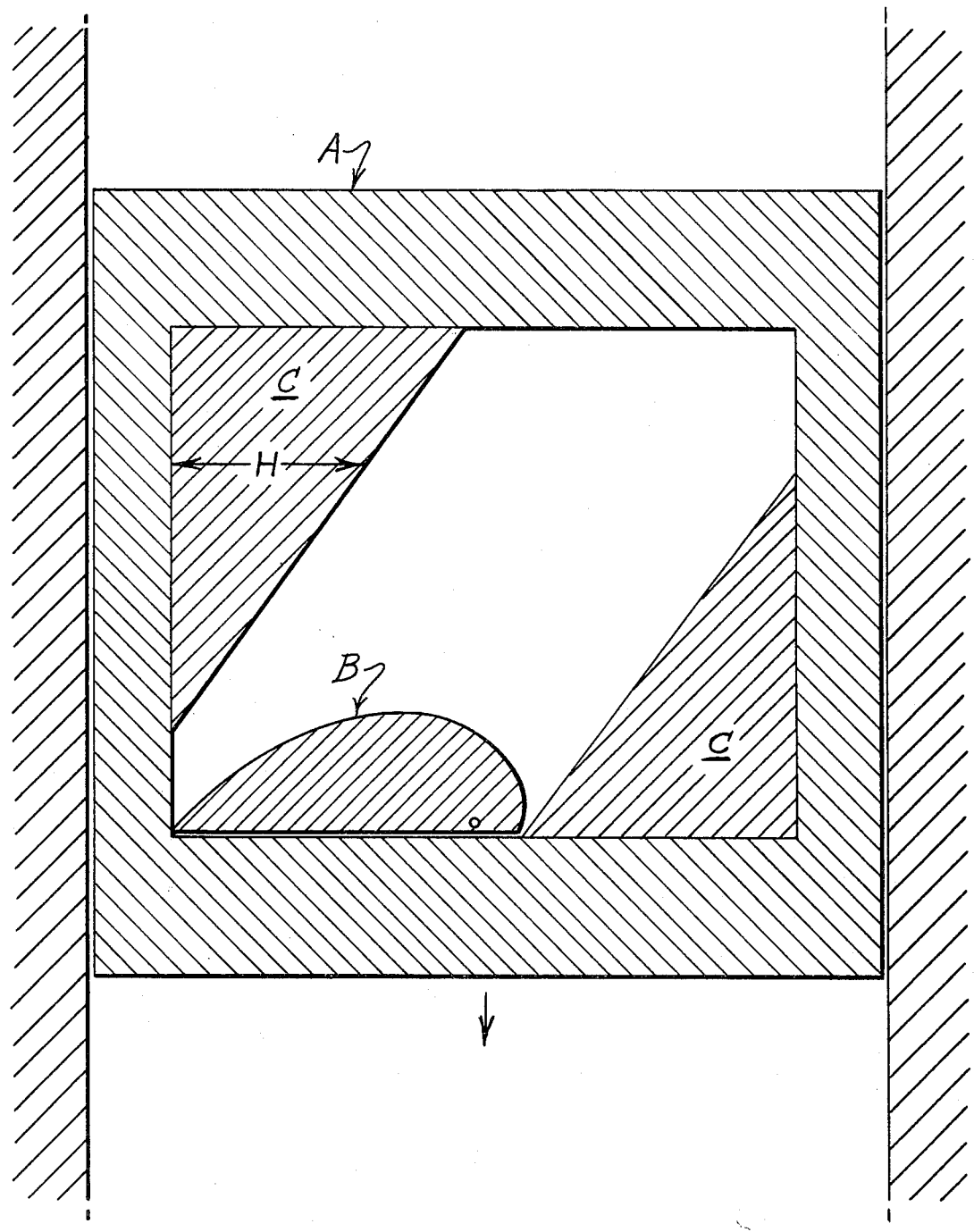

MOTION TO ROTARY MOTION

The invention is a machine that translates linear reciprocating motion to rotary motion and is suitable for the power take off from a free piston engine or a conventional reciprocating engine. It consists of two parts. Part A, the part which applies the force, reciprocates linearly. Part B rotates within a slot in Part A. The slot in Part A contains a wedge cam on each side. When Part A is moving in one direction a wedge cam makes contact with the follower of Part B and rotates it 180 degrees. When Part A reverses direction the other wedge cam engages Part B and rotates it the other 180 degrees for a complete rotation. The design of the cams and the follower is such that a line connecting the point of contact between the two members and the axis of rotation of Part B will always form a right angle with the direction of motion of Part A. The ratio of linear movement of Part A to the rotating movement of Part B, can be varied within a stroke over a wide range of values.

FIG. 2 illustrates various parameters used in the description of Parts A and B.

Figure 1:
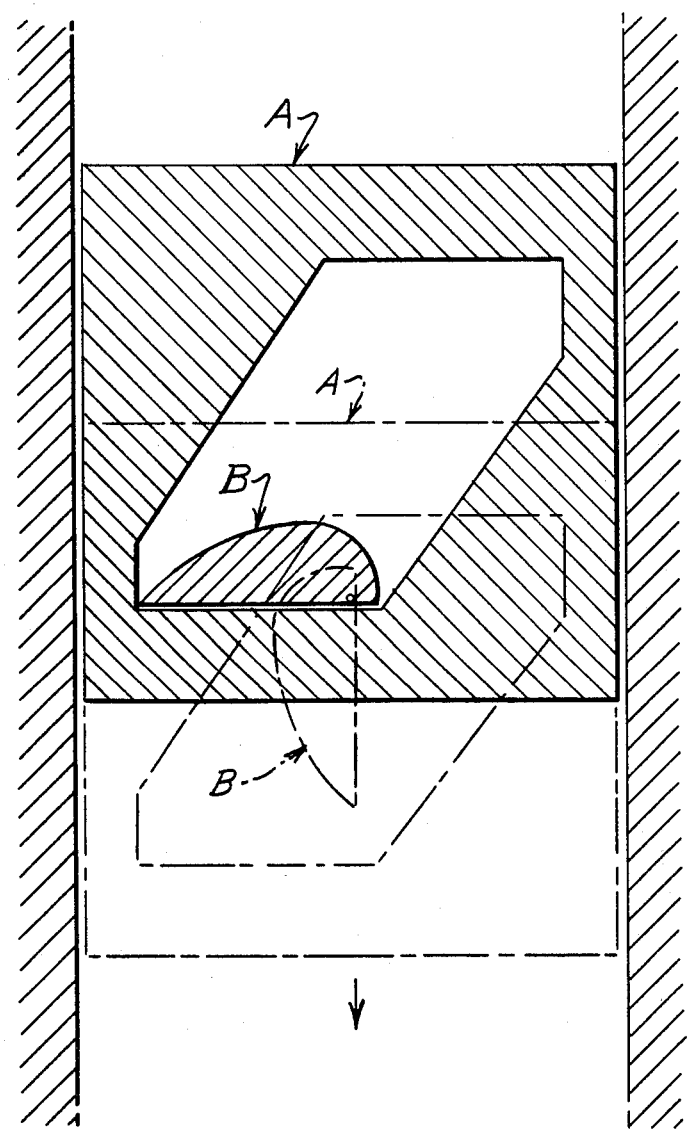
FIG. 1 illustrates the interaction between Part A and Part B of the machine as the linear motion of Part A drives Part B in rotary motion.

There are two moving parts, a reciprocating part, A and a rotating part, B. Part A reciprocates linearly. It moves back and forth in a straight line for the same distance for each cycle. This motion is the same as that of a piston in a reciprocating engine. Within Part A there is a rectangular opening which encompasses the rotating member, Part B. There are two wedge cams (labled C in FIG. 2) placed, one each, on the sides of the opening parallel to the direction of motion of Part A with their thick ends in opposite corners. Part B rotates about an axis (at the center of the circle with the directional arrow in FIG. 2). Part B will rotate 360 degrees every time Part A travels through a complete reciprocation or cycle.

To simplify the discussion of Parts A and B, we will treat them as if they did not vary with the dimension that is at a right angle to the plane of rotation of Part B. When Part A is moving down, the wedge cam on the left will make contact with Part B, rotating Part B 180 degrees as is illustrated in FIG. 1. When Part A is moving up the wedge cam on the right contacts Part B, which is now inverted, and rotates Part B the remaining 180 degrees for a complete rotation of 360 degrees. The machine is now in its original position.

For the purpose of the following, we will define the initial point of contact as the point where Parts A and B first make contact after Part A has reversed direction. The final point of contact is the point where Parts A and B are in contact after Part B has rotated 180 degrees from the position it was in at the initial point of contact. The height of a point on the wedge cam is defined as the distance H in FIG. 2. The radius to a point on the surface of Part B is defined as the points distance from the axis of rotation of Part B. The surface lengths are the distances measured along the contacting surfaces from the initial point of contact to the point of reference.

For the machine to behave as described in the claim, the following constraints on the shape of the wedge cams and of Part B must be satisfied:
(1) The height of the wedge cam at the final point of contact must be equal to Part B's radius at the initial point of contact less its radius at the final point of contact.
(2) The increase of height per surface length of the wedge cams must equal the decrease of radius per surface length of Part B.

As other modifications of the invention may be made without departing from the spirit of the invention, the scope of the invention is to be determined by the following claim.

I claim:

1. A machine which translates linear reciprocating motion to rotating motion comprising:
    a reciprocating part having an opening, said opening having opposed, rectilinear side surfaces which are parallel to each other and inclined relative to the direction of motion of said reciprocating part; and,
    a rotating part which includes a shaft having a cam secured thereto that rotates within the opening in the reciprocating part;
    the reciprocating and rotating parts being shaped such that
    (a) the side surfaces engage the cam and rotate it 180 degrees every time the reciprocating part moves through one half of its reciprocating cycle;
    (b) a line connecting the point of contact between the two parts and the axis of rotation of the rotating part will always be perpendicular to the direction of motion of the reciprocating part; and,
    (c) the contact between the two parts is always pure rolling contact.

* * * * *